United States Patent [19]
Lentz et al.

[11] Patent Number: 5,533,185
[45] Date of Patent: Jul. 2, 1996

[54] PIXEL MODIFICATION UNIT FOR USE AS A FUNCTIONAL UNIT IN A SUPERSCALAR MICROPROCESSOR

[75] Inventors: Derek J. Lentz, Los Gatos; Linley M. Young, San Diego, both of Calif.

[73] Assignee: Seiko Epson Corporation, Tokyo, Japan

[21] Appl. No.: 141,966

[22] Filed: Oct. 28, 1993

Related U.S. Application Data

[63] Continuation-in-part of Ser. No. 798,705, Nov. 27, 1991, abandoned.

[51] Int. Cl.⁶ .................................................. G06F 15/00
[52] U.S. Cl. .......................... 395/162; 395/137; 395/280; 345/126
[58] Field of Search ................................. 395/162–164, 395/133–138, 325, 375, 280, 306, 309; 345/55, 121, 126, 153, 185, 189, 191, 133

[56] References Cited

U.S. PATENT DOCUMENTS

| | | | |
|---|---|---|---|
| 4,648,045 | 3/1987 | Demetrescu | 364/518 |
| 4,689,738 | 8/1987 | Van Wijk et al. | 395/800 |
| 4,874,164 | 10/1989 | Miner et al. | 340/720 |
| 4,941,190 | 7/1990 | Joyce | 382/54 |
| 5,056,041 | 10/1991 | Guttag et al. | 395/164 |

FOREIGN PATENT DOCUMENTS

354024A3  7/1990  European Pat. Off. .
WO8605299  9/1986  WIPO .

OTHER PUBLICATIONS

"Printer Using Direct Memory Access to Reduce Communications Bandwidth," *IBM Technical Disclosure Bulletin*, vol. 33, No. 8, Jan. 1991 (pp. 485–486).

*Primary Examiner*—Kee Mei Tung
*Attorney, Agent, or Firm*—Sterne, Kessler, Goldstein & Fox

[57] ABSTRACT

A pixel modification unit is provided for carrying out a variety of raster graphic manipulations in a RISC graphics processor. The pixel modification unit comprises a logic function unit, a masking unit, and a byte mirror unit. The logic function unit can perform any of 16 different logic operations between each bit of a source operand and a destination operand. The source operand may be a bit map fixed data, while the destination operand is pixel data in the bit map corresponding to the graphics image to be modified. The masking unit can mask any or all bits of a destination operand so that the logic function unit does not operate on the masked bits. When masking is implemented, the output of the pixel modification unit is derived from the masked bits from the destination operand and the unmasked bits which were operated on by the logic function unit. The byte mirror unit horizontally reflects a figure in the bit map via reversing the bit order of data bytes retrieved from the bit map. The present invention includes a high performance orthogonal rotator for a graphics processor that orthogonally rotates pixel regions in a bit map by an angle of 90° or 270°. Optionally, the pixel regions can be vertically mirrored as well as orthogonally rotated.

5 Claims, 7 Drawing Sheets

PIXEL MODIFICATION UNIT FOR USE AS A FUNCTIONAL UNIT IN A SUPERSCALAR MICROPROCESSOR

This is a continuation-in-part of application Ser. No. 07/798,705 filed Nov. 27, 1991, now abandoned, and priority under 35 U.S.C. §120 is also claimed to commonly owned application Ser. No. 07/726,929, filed Jul. 8, 1991, now abandoned; and application Ser. No. 07/798,704 filed Nov. 27, 1991. These applications are incorporated herein by reference.

BACKGROUND OF THE INVENTION

I. Field of the Invention

The present invention relates to the field of computer graphics and, more particularly, to manipulating data stored in a bit map pertaining to a video image to be presented by a raster printer, screen, display device, or other humanly visible manifestation.

II. Related Art

In raster graphics systems, a graphics image is stored in memory and presented to a printer, screen, or display device by representing the image in the form of a matrix of bits. The matrix is referred to as a "bit map" or a "frame buffer." For monochrome systems, one bit in the bit map represents one visible dot, or picture element (pixel, for short), on the display. For gray scale or color systems, several bits in the bit map represent one pixel or group of pixels on the display.

Many types of graphics processors have been designed and implemented in the art for controlling the display of graphics images. Graphics processors dedicated to this task help relieve the processing burden of the controlling processor. Graphics processors are usually designed to not only generate image dam, but also manipulate existing image dam in the bit map. Typical graphics manipulations include, for example, rotation and translation. "Rotation" refers to moving an image, or parts thereof, about an axis perpendicular to the display. In contrast, "translation" refers to the linear component of movement, i.e., movement across the display without rotation.

The manipulation of an image requires extensive arithmetic calculations. A reason is that the bit map is dealt with as a coordinate system having an X and a Y component. In order to manipulate a bit in the bit map, both the X and Y components must be considered. In the "X window system," which is an industry standard specification for windowed graphics developed by the Massachusetts Institute of Technology (MIT), Boston, Mass., U.S.A., sixteen mathematical operations maybe used in order to logically operate upon two operands, such as an X and a Y component representing a pixel.

As a result of the complex mathematics involved in manipulating graphics images, many design techniques have been implemented by those skilled in the art in order to reduce the number of arithmetic gyrations while still providing for manipulation of images. These techniques can be carried out via software, hardware, or combinations thereof. Generally, hardware implementations are faster than software, but their flexibility is more limited.

A well known technique called "masking" has been utilized to reduce the number of requisite mathematical operations when performing image manipulations. Essentially, blocks of pixels are treated as a unit with consideration only to the edge pixels. While the inner pixels of a block are masked from consideration, the number of mathematical operations necessary to manipulate the block is severely reduced. In the art, the transfer of and manipulation of a block of pixels is oftentimes referred to as "bit boundary block transfer" (BitBlt).

Another technique is "clipping." "Clipping" refers to the process of eliminating a portion of an image. Similar to masking, blocks of pixels are treated as a unit with consideration only to edge pixels. Part of an image is clipped away from another part along an edge of pixels, thereby eliminating a portion of the image. Using this procedure, it is not necessary to perform mathematical calculations on pixel data within the area that has been removed.

Still another well known technique for reducing the number of mathematical operations necessary to perform image manipulations is "mirroring." "Mirroring" is used to symmetrically reflect an image, or parts thereof, about an axis, such as a vertical or horizontal axis. The mirroring of data is oftentimes accomplished by sending pixel data through a barrel shifter or like device.

Although the foregoing techniques have to some extent reduced the arithmetic overhead associated with performing image manipulations, graphics processors with higher performance and flexibility than those in the past are still needed in the highly competitive graphics industry where speed and efficiency are the primary driving forces.

SUMMARY OF THE INVENTION

The present invention is a high performance, pixel modification unit for performing manipulations to bit map data in a graphics processor. The pixel modification unit comprises a logic function unit, a masking unit, and a byte mirror unit.

The logic function unit can perform logic operations on individual bits of two operands referred to as a "source" operand and a "destination" operand. The source operand may be pixel data from a bit map or fixed data, whereas the destination operand is pixel data from a graphics bit map used by a printer, display device, or the like.

The masking unit can mask any or all bits of a destination operand so that the logic function unit does not operate on the masked bits. When masking is implemented, the output of the pixel modification unit is derived from the masked bits from the destination operand and the unmasked bits which were operated on by the logic function unit. The derivation is provided by a multiplexer unit which is controlled by the masking unit.

The byte mirror unit horizontally mirrors, or reflects, a figure in the bit map via simply reversing the bit order of bytes within pixel data retrieved from the bit map.

The present invention has many advantages. One advantage of the present invention is that bitwise logic operations can be performed on pixel data from a graphics bit map, thereby permitting extreme flexibility in regard to the types of possible logic operations that may be performed. Another advantage is that pixel data may be masked, in whole or in part, thereby allowing for elective manipulation of the bit map. Yet another advantage is that efficient mirroring of an image is provided by simple multiplexing. Still another advantage is that the present invention can be implemented in inexpensive, high performance hardware. Finally, the present invention can be integrated into an integrated circuit (IC), such as a RISC microprocessor. Undoubtedly, other features and advantages of the present invention will become more apparent to one of skill in the art upon examination of the text and the drawings associated herewith.

In a second embodiment of the present invention is an orthogonal rotator which can be used to orthogonally (90° or 270°) rotate as well as vertically mirror a bit map region in a graphics processor.

In the second embodiment, a register array means is configured in the form of a matrix having rows and columns of bit locations. A bit control means in conjunction with a word control means controls the register array means. The bit control means loads source data bytes from a source bit map into the columns of the register array means. Orthogonal rotation and vertical mirroring is accomplished by the order in which bytes are loaded into the register array means from the source bit map in combination with the order in which words (4 bytes) are read into a destination bit map.

Specifically, to accomplish a 90° rotation without vertical mirroring, the bit control means loads source data bytes into the columns of the register array means in the order beginning with the least significant bit (LSB) positions residing in the far left column (hereafter, LSB column) and ending with the most significant bit (MSB) positions residing in the far right column (hereafter, MSB column). The word control means then reads data words from the register array means beginning with the most significant word (MSW) in the bottom register and ending with the least significant word (LSW) in the top register.

To achieve a 90° rotation with vertical mirroring, data bytes are loaded into the register array means in the order beginning with the LSB column and ending with the MSB column. Then, data words are read from the register array means beginning with the LSW in the top register and ending with the MSW in the bottom register.

To accomplish a 270° rotation without vertical mirroring, data bytes are loaded into the register array means in the order beginning with the MSB column and ending with the LSB column. The word control means then reads words from the register array means beginning with the LSW in the top register 108 and ending with the MSW in the bottom register.

To effectuate a 270° rotation with vertical mirroring, source data bytes are loaded into the register array means in the order beginning with the MSB column and ending with the LSB column. Then, data words are read from the register array means beginning with the MSW in the bottom register and ending with the LSW in the top register.

The present invention has many advantages and applications. For example, it can be easily implemented in little real estate within an integrated circuit, such as a RISC type microprocessor, in order to provide for rapid and reliable rotation of image data (byte by byte) in a bit map.

The orthogonal rotator can easily implement a clearing function.

The independent operation of the orthogonal rotator permits other subsystems of a graphics processor to concurrently function while the orthogonal rotator is performing, thereby providing a more rapid graphics capability.

Still another advantage of the present invention is that it allows for a trade-off among hardware, software, performance, and space requirements. For instance, data can be read from the novel orthogonal rotator, via software or hardware, or combinations thereof, depending upon the performance and space requirements. Moreover, the number of word registers in the orthogonal rotator is flexible. The number of word registers can be increased to thereby increase the performance of the system at the expense of space. In other words, although the preferred embodiment has 8 word registers, this number could be increased to 16 or 32, if desired. Furthermore, if hardware costs and real estate are of primary concern, then the number of word registers can be reduced.

Yet another advantage of the present invention is that the novel orthogonal rotator may be used in combination with a simple horizontal mirroring system which can effectively rotate a bit map region by an angle of 180°, to thereby provide for all rotations in increments of 90°.

BRIEF DESCRIPTION OF THE DRAWINGS

The present invention, as defined in the claims, can be better understood with reference to the following drawings.

DETAILED DESCRIPTION OF THE PRESENT INVENTION

The present invention will be described with reference to three sections: 1) the pixel modification section, 2) the orthognal rotator-section, and 3) the overall environment of the present invention.

Figure 1:
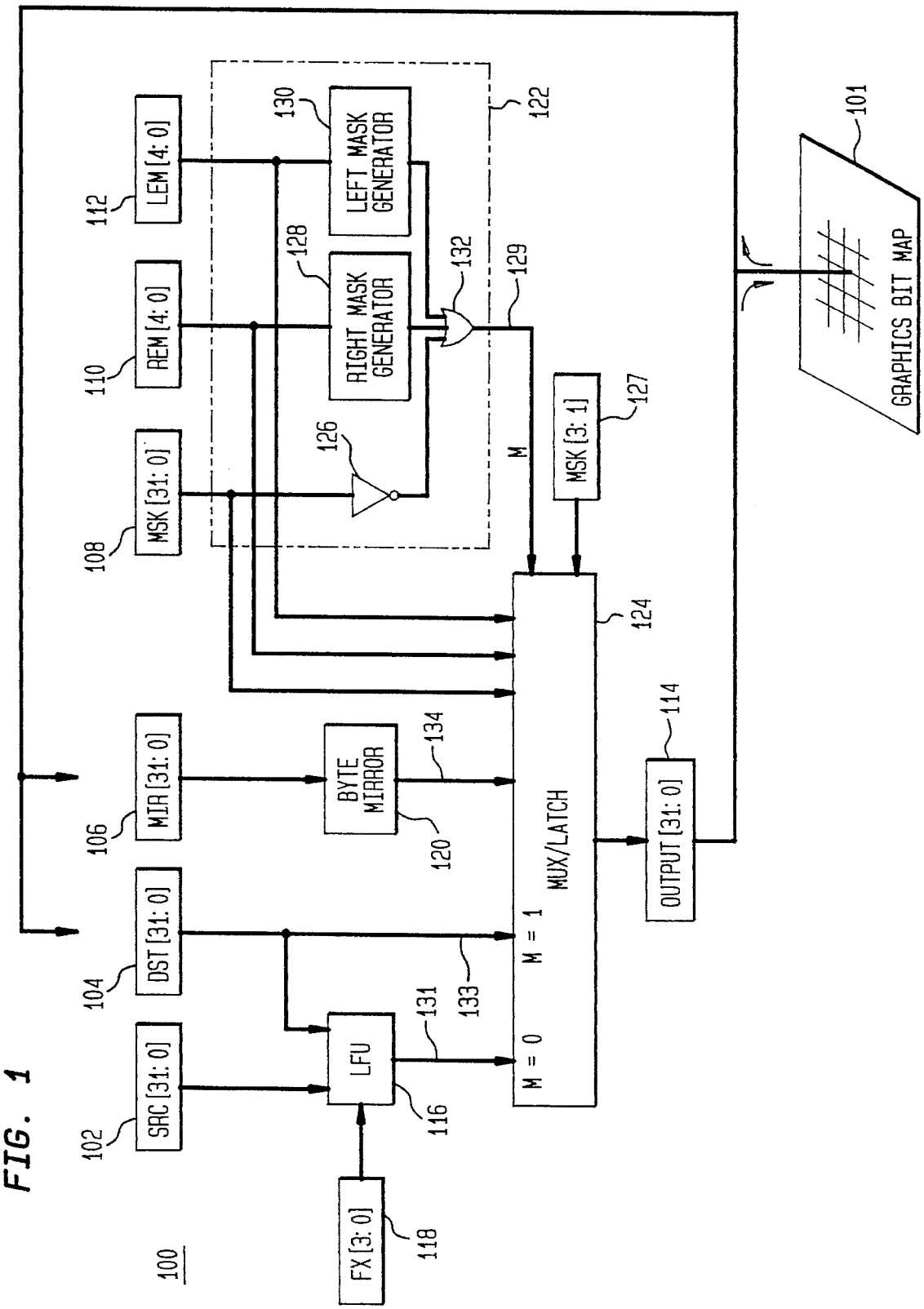
FIG. 1 illustrates a block diagram of the pixel modification unit in accordance with the present invention.

I. Pixel Modification Unit For Use as a Functional Unit in a Superscalar Microprocessor The architecture of the pixel modification unit 100 in accordance with the present invention is illustrated in FIG. 1. The pixel modification unit 100 can be implemented in a graphics processor to modify pixel data contained within a graphics bit map 101 (also known in the art as a destination bit map) corresponding to an image to be printed or displayed on a display device. Generally, the pixel modification unit 100 receives various input operands 102–112, which includes a pixel data from graphics bit map 101, performs mathematical manipulations on these operands, and then provides an output 114, which is pixel data stored back in the graphics bit map 101.

In accordance with the present invention, the pixel data in the graphics bit map may be modified by masking the destination operand 104, byte mirroring of a mirror operand 106, and bitwise logic operations between a source operand 102 and a destination operand 104. In the context of this document, the "mirror" operand 106 and "destination" operand 104 are pixel data from the graphics bit map 101 corresponding to a printer, display device, or the like. On the other hand, the "source" operand 102 is a pixel data from a bit map or fixed data which can be dynamically programmed, for example, by controlling software.

With reference to FIG. 1, the pixel modification unit 100 comprises a logic function unit (LFU) 116, a byte mirror unit 120, a masking unit 122, and a multiplexer (MUX/LATCH) 124.

In the preferred embodiment, the logic function unit 116 latches a 32-bit source (SRC) operand 102 and a 32-bit destination (DST) operand 104. The byte mirror unit 120 latches a 32-bit mirror (MIR) operand 106, which is essentially a destination operand to be horizontally mirrored, or reflected. The masking unit 122 latches a 32-bit mask (MSK) operand 108, a 5-bit right edge mask (REM) operand 110, and a 5-bit left edge mask (LEM) operand 112. The interrelation of the foregoing mask operands will be discussed in further detail below. The multiplexer 124 selects and latches the outputs of the logic function unit (LEU) 116, the byte mirror unit 120, or the masking unit 122 so as to provide the 32-bit output 114.

The logic function unit 116 can perform any of 16 industry standard logic functions in a bitwise fashion between the source operand 102 and the destination operand 104. The logic operation performed by the logic function unit 116 is determined by the dynamically programmable 4-bit control input FX[3:0] 118. The logic function unit 116 decodes the control input FX[3:0] 118 as indicated in Table A hereafter.

TABLE A

| LFU Operation | FX [3:0] |
| --- | --- |
| 0 | 0000 |
| SRC&DST | 0001 |
| SRC&~DST | 0010 |
| SRC | 0011 |
| ~SRC&DST | 0100 |
| DST | 0101 |
| SRC^DST | 0110 |
| SRC|DST | 0111 |
| ~SRC&~DST | 1000 |
| ~SRC^DST | 1001 |
| ~DST | 1010 |
| SRC|~DST | 1011 |
| ~SRC | 1100 |
| ~SRC|DST | 1101 |
| ~SRC|~DST | 1110 |
| 1 | 1111 |

The masking unit 122 comprises a logic inverter 126, a right mask generator 128, a left mask generator 130, a combiner 132, which is merely an OR logic function in the preferred embodiment. The logic inverter 126 inverts the bits of the mask operand 108 and is merely a design specific detail in the preferred embodiment. The inverter 126 is used to set the polarity of the mask data which in turn allows the pixels to be modified, but need not be implemented in order to accomplish the features of the present invention. Moreover, the right and left mask generators 128, 130 decode the REM operand 110 and the LEM operand 112, respectively, in order to mask the destination operand 104. In other words, these operands are used to determine which bits will be unchanged by the logic function unit 116. The outputs from the right and left mask generators 128, 130 in response to the respective values of the REM and LEM operands 110, 112 are shown below in respective Tables B and C.

TABLE B

| REM [4:0] | Right Generator Output [31:0] |
| --- | --- |
| 00000 | 11111 ... 1110 |
| 00001 | 11111 ... 1100 |
| 00010 | 11111 ... 1000 |
| . | . |
| . | . |
| . | . |
| 11111 | 00000 ... 0000 |

TABLE C

| LEM [4:0] | Left Generator Output [31:0] |
| --- | --- |
| 00000 | 00000 ... 0000 |
| 00001 | 00000 ... 0001 |
| 00010 | 00000 ... 0011 |
| . | . |
| . | . |
| . | . |
| 11111 | 01111 ... 1111 |

As indicated in FIG. 1, the outputs from the right and left mask generators 128, 130 are combined with the inversion of the mask operand 108 by the combiner 132. The outcome of this combining function, denoted by reference numeral 129, determines whether original bits 133 of the destination operand 104, or alternatively, modified bits 139 of the destination operand 104 are passed through the multiplexer 124 to the output 114.

For further clarification of bitwise operations in accordance with the present invention, consider the following example. Consider the scenario when all bits of the destination operand 104 are to be modified. In such case, the output 114 will be the result of LFU operation on all 32-bits of the original destination operand 104. The bits comprising the output 114 are outputted from LFU 116 as indicated by reference arrow 131. In order to accomplish the desired effect, all bits 128 from the masking unit 122 must be at a logic low (M=0). A possible combination of masking operands 108, 110, 112 would be as follows: MSK[31:0]=11 ... 111, REM[4:0]=11111 and LEM[4:0]=00000.

As another example, consider the case when only the bits 3–27 of the destination operand 104 wish to be modified. A possible combination of mask operands 108, 110, 112 which could achieve this result is as follows: MSK[31:0]=0000111 ... 1000, REM[4:0]=11111, and LEM[4:0]=00000. Another possible combination resulting in the same functionality would be as follows: MSK[31:0]=1111 ... 1111, REM[4.0] =11011, and LEM[4.0]=00011. Hence, it is apparent that many combinations of the mask operands 108, 110, 112 can result in the same ultimate masking operation.

The horizontal mirroring of images, or parts thereof, is another important feature of the present invention. The byte mirror unit 120 reverses the bit order of each byte (4 bytes=1 word) within each mirror operand 106, which is essentially a data word having 4 data bytes. The mirrored word is sent to the multiplexer 124, as indicated by a reference arrow 134.

Figure 2:
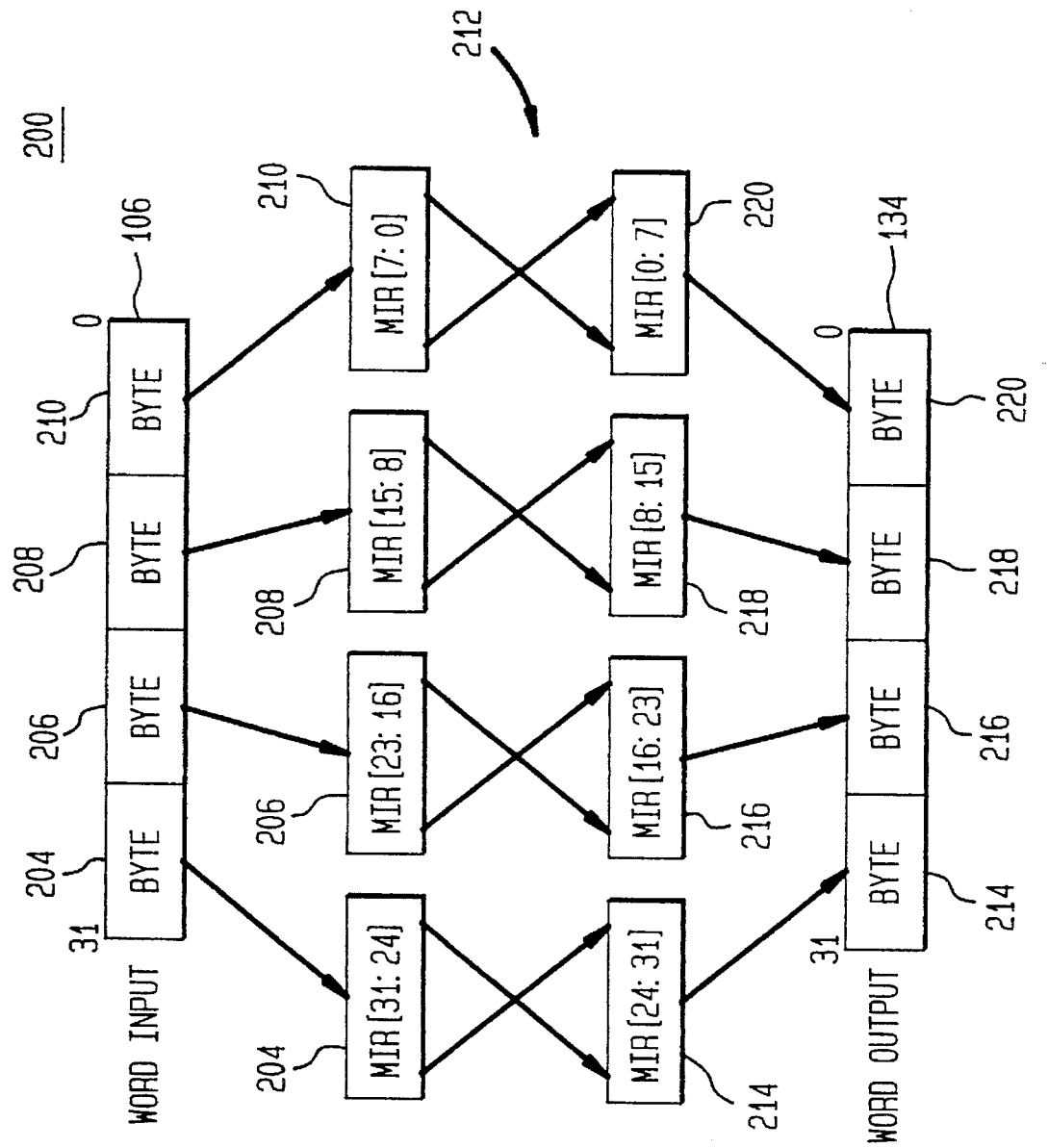
FIG. 2 illustrates a low-level block diagram of the byte mirror unit shown in FIG. 1.

A low level block diagram of the byte mirror unit 120 is illustrated in FIG. 2. In accordance with the preferred embodiment, byte mirroring involves simply crossing logic paths or wires. Consequently, it is easy to implement and is reliable. Byte mirroring is sufficient added support for horizontal mirroring of bit map images in most instances because different data sizes, such as 2 and 4 bytes, can be mirrored on a byte basis, and bytes can be swapped with other conventionally available hardware.

Referring to FIG. 2, a 32-bit word input MIR[31:0] 106 comprising four data bytes 204, 206, 208, 210 is operated upon by the byte mirror unit 120 so as to reverse the order of bits within each byte, as collectively indicated by a reference numeral 212. For example, the byte located in the most significant position of the word input 106, denoted by reference 204, is transformed into a byte 214 which still resides in the most significant position of the word input 106, but has been transposed to reverse bit order.

Referring again to FIG. 1, the multiplexer 124 can output any of the following: the mirror operand 106, the mask operand 108, the REM operand 110, the LEM operand 112, or the modified destination operand (LFU output) 130. The multiplexer 124 is controlled by the output 129 of the masking unit 122 and also by a dynamically programmable select register 127. The select register 127 is decoded into read enables for the multiplexer 124.

II. Orthogonal Rotator

Figure 3:
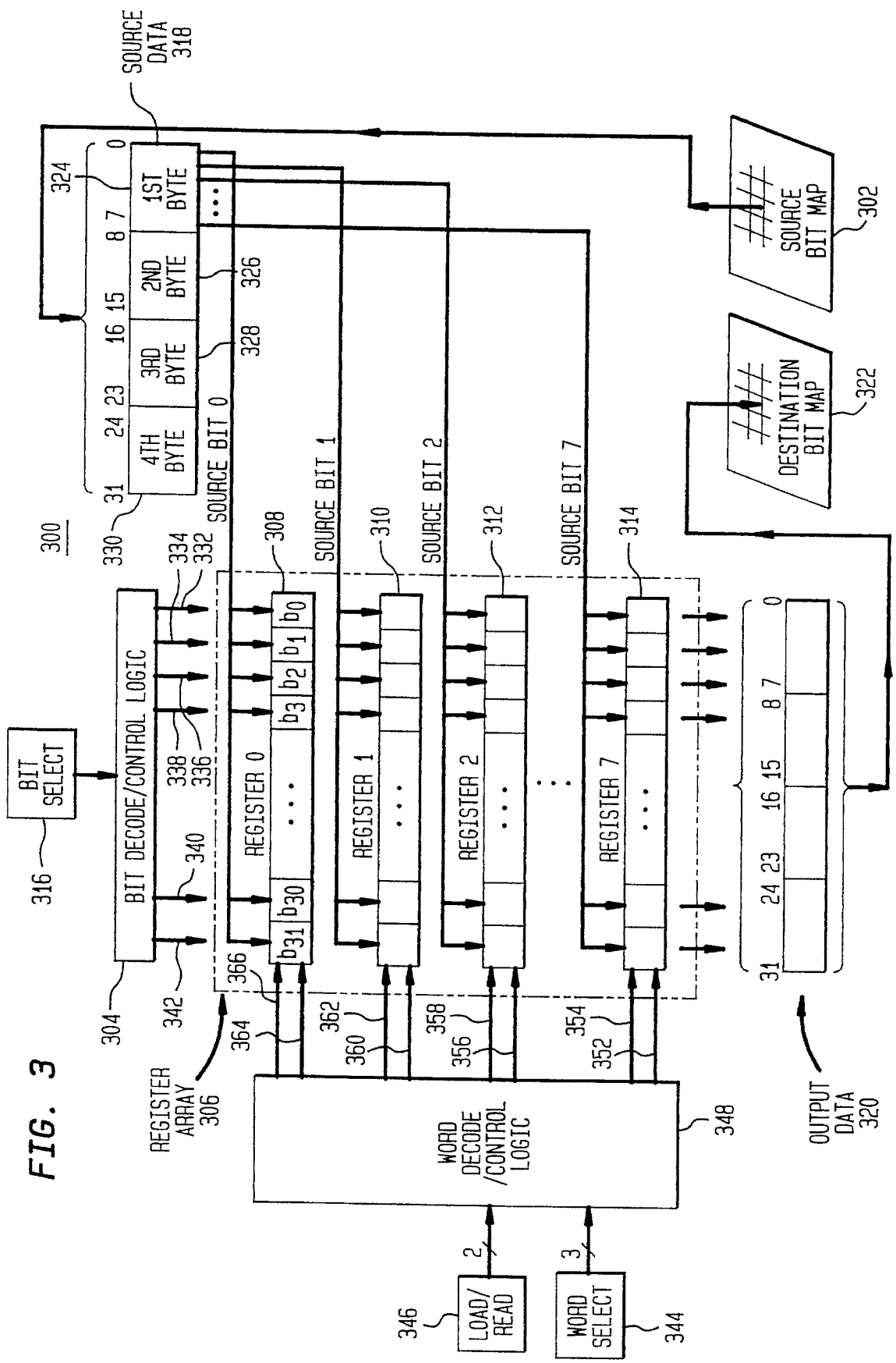
FIG. 3 is a block diagram of the orthogonal rotator having a register array in accordance with the present invention.

FIG. 3 is a block diagram of a high performance orthogonal rotator 300 in accordance with the present invention. The orthogonal rotator 300 can orthogonally rotate, i.e., rotate by 90° or 270°, as well as vertically mirror regions of bit map data on a byte-by-byte basis from a graphics source bit map 302.

Figure 4A:
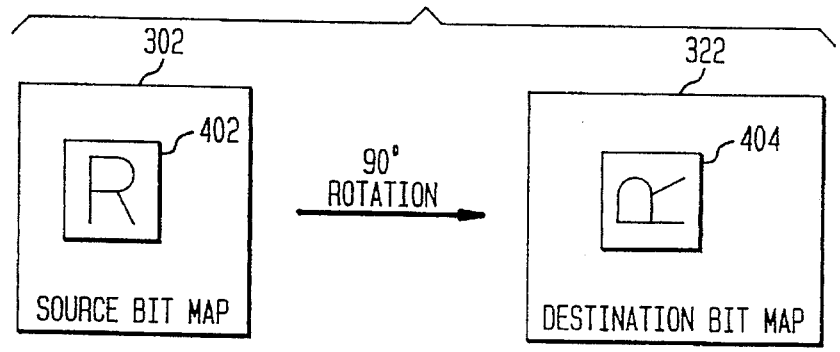
FIG. 4(a) illustrates a 90° rotation of a region within a video image in a bit map.

FIGS. 4(a)–4(d) visually illustrate the concepts of orthogonal rotation and vertical mirroring in the context of this document. In FIG. 4(a), a region 402 within the source bit map 302 is rotated by an angle of 90° (counterclockwise convention), as shown by the orthogonally-rotated region 404 in the destination bit map 322.

Figure 4B:
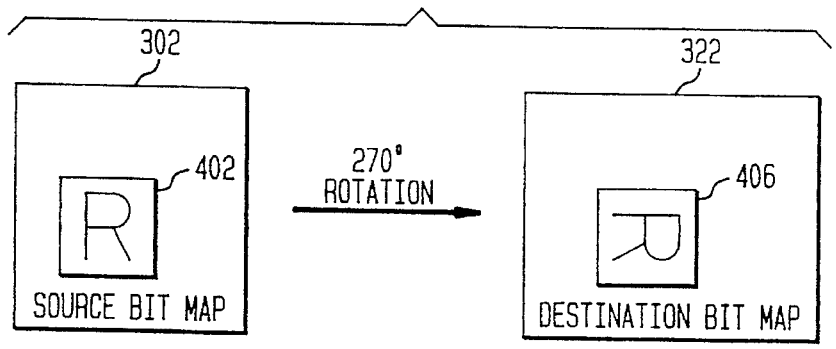
FIG. 4(b) illustrates a 270° rotation of a region within a video image in a bit map.

In FIG. 4(b), the bit map region 402 within the source bit map 302 is orthogonally rotated by an angle of 270° (counterclockwise convention), as indicated by the orthogonally-rotated region 406 in the destination bit map 322.

Figure 4C:
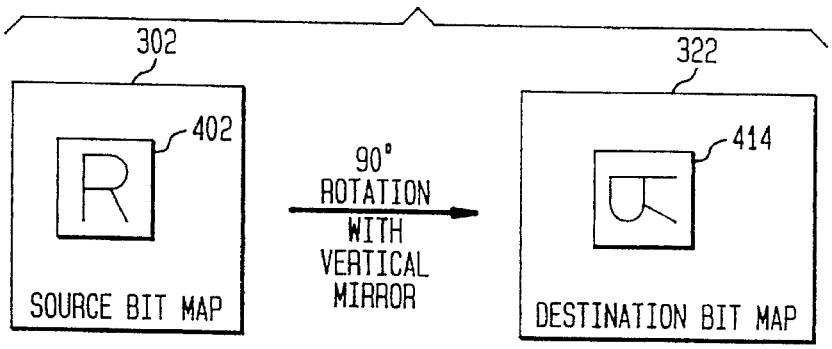
FIG. 4(c) illustrates a 90° rotation with vertical mirroring of a region within a video image in a bit map.

In FIG. 4(c), the bit map region 402 within the source bit map 302 is rotated by an angle of 90° and is also vertically mirrored. The configuration of the rotated and vertically-mirrored region 414 is shown in the destination bit map 322.

Figure 4D:
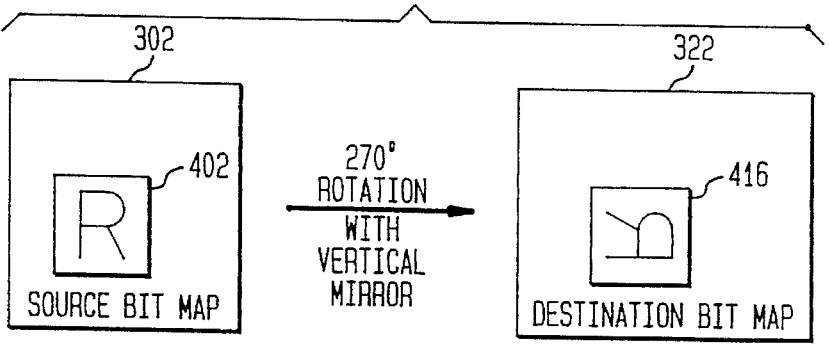
FIG. 4(d) illustrates a 270° rotation with vertical mirroring of a region within a video image in a bit map.

Furthermore, in FIG. 4(d), the bit map region 402 within the source bit map 302 is orthogonally rotated by an angle of 270° and is also vertically mirrored. The configuration of the rotated and vertically-mirrored region 416 is illustrated in the destination bit map 322.

Referring back to FIG. 3, from an architecture vantage point, the novel orthogonal rotator 300 comprises a bit decode/control logic 304, a word decode/control logic 348, and a register array 306. In the preferred embodiment, the register array 306 has 8 rows of respective registers 308–314. Generally, a bit select control signal 316 from controlling software, for example, is provided to the bit decode/control logic 304, while source data 318 is provided to the registers 308–314, so as to generate orthogonally-rotated output data 320. The orthogonally-rotated output data 320 is placed in the graphics destination bit map 322, as shown.

A common convention in the graphics industry is to have the least significant bit (LSB) of each byte on the left of image bit maps and the most significant bit (MSB) of each byte on the right of image bit maps. The foregoing common convention is used in the description herein for discussion purposes, but this convention need not be utilized in order to practice the present invention. Thus, in FIG. 3, the bit $b_{31}$ corresponds to the rightmost bit in the bit maps, while the $b_0$ corresponds to the left-most bit in the bit maps. Moreover, the least significant word (LSW) is stored in the top register 308, while the most significant word (MSW) is stored in the bottom register 314.

The present invention envisions transferring source data bytes (8 bits) into columns of the register array 306. Source data bytes are written to the register array until the array is full, completely or in part. As specifically shown in FIG. 3, each source data byte 324–330 is bit spliced so that each of its bits is channeled to a different register (or row) 308–314. Each bit-spliced bit is then multiplexed to all bits of its exclusive register, i.e., one of registers 308–314. For instance, source bit 0 is passed to all 32 bits of array register 0. Source bit 1 is passed to all 32 bits of array register 1, and so on, as shown in FIG. 1.

The bit select control signal 316 is decoded by the bit decode/control 304 so as to generate a set of 32-bit load select control signals, which are fed to the respective registers 308–314, as shown in FIG. 3. The load select signals are bit sliced across the columns of the register array 306. In other words, load select control bit 0, denoted by reference numeral 332, controls the column 0 comprising all bits $b_0$. Load select control bit 1, denoted by reference numeral 334, controls the column 1 comprising all bits $b_1$, and so on. Thus, the bit select control signal 316 selects the array column where the inputted source data byte will be written. Furthermore, even though a source data bit is multiplexed over all bits of a register 308–314, only 1 bit of each register 308–314 is loaded by the source data bit.

Furthermore, a word select control signal 344 and a load/read control signal 346 are decoded by a word decode/control logic 348 so as to generate a word load signal and a word read signal for each of the registers 308–314, as shown in FIG. 3.

Figure 5:
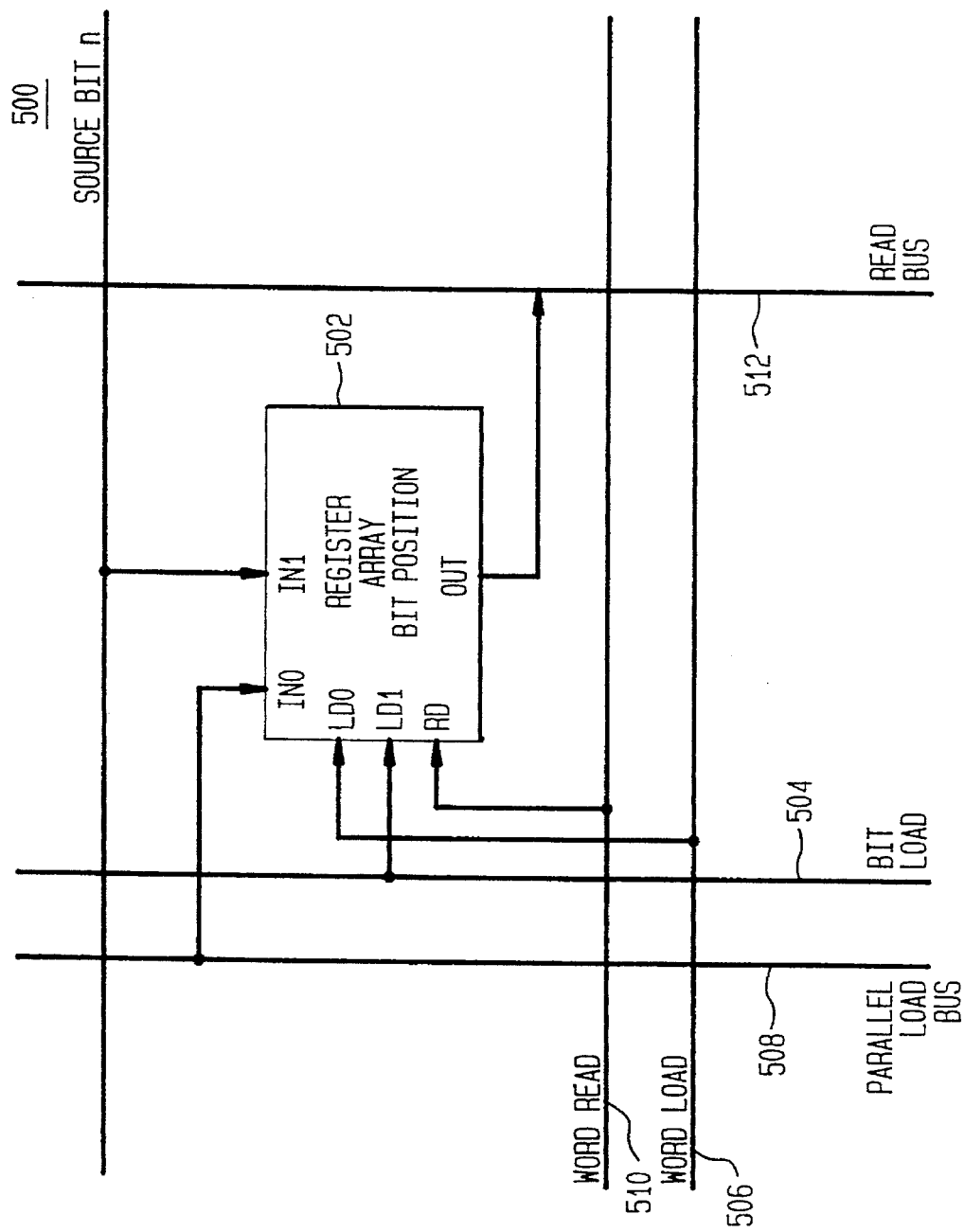
FIG. 5 illustrates a block diagram of a register array bit within the register array of FIG. 3 with the surrounding communication paths.

FIG. 5 illustrates a block diagram of an arbitrary register array bit position 502 within the register array 306. The register array bit position 502 may be any of the bits $b_{31}$–$b_0$ within any of the registers 308–314 in FIG. 3.

As shown in FIG. 5, a bit load 504, in response to a bit select signal 316, can cause a source bit n ($0 \leq n \leq 7$, in the preferred embodiment) to be placed into the register array bit position 502. A word load 506, in response to a word select control signal in combination with a load control signal, can cause a word from a parallel load bus 508 to be placed in the particular word register, or row, containing the register array bit 502. A word read 510, in response to a word select control signal in conjunction with a read control signal, can cause a word to be written to a read bus 512. Hence, because of the word load 506 and the word read 510, there is random access to the registers 308–314, or rows, within the register array 306. Moreover, there is random access to bits $b_{31}$–$b_0$ within the set of registers 308–314, or rows, as a result of the bit load 504 to the register array bit position 502.

In accordance with another feature of the present invention, the orthogonal rotator can permit clearing of either all registers simultaneously or individual registers. The bit control/decode logic 304 can cause clearing of all registers 308–314 in a simultaneous fashion. Such a total clearing function may be desirable for initialization purposes, for example. For this type of clearing, the entire orthogonal rotator 300 may be pre-loaded via a single instruction (not shown) to the bit control/decode logic 304. In addition, clearing of individual registers may be performed via the word control/decode logic 348. In the context of this document, "clearing" means that a register(s), or row(s), is filled with the same state (either 1 or 0) of the source bit n, which is channeled to the register.

Figure 6:
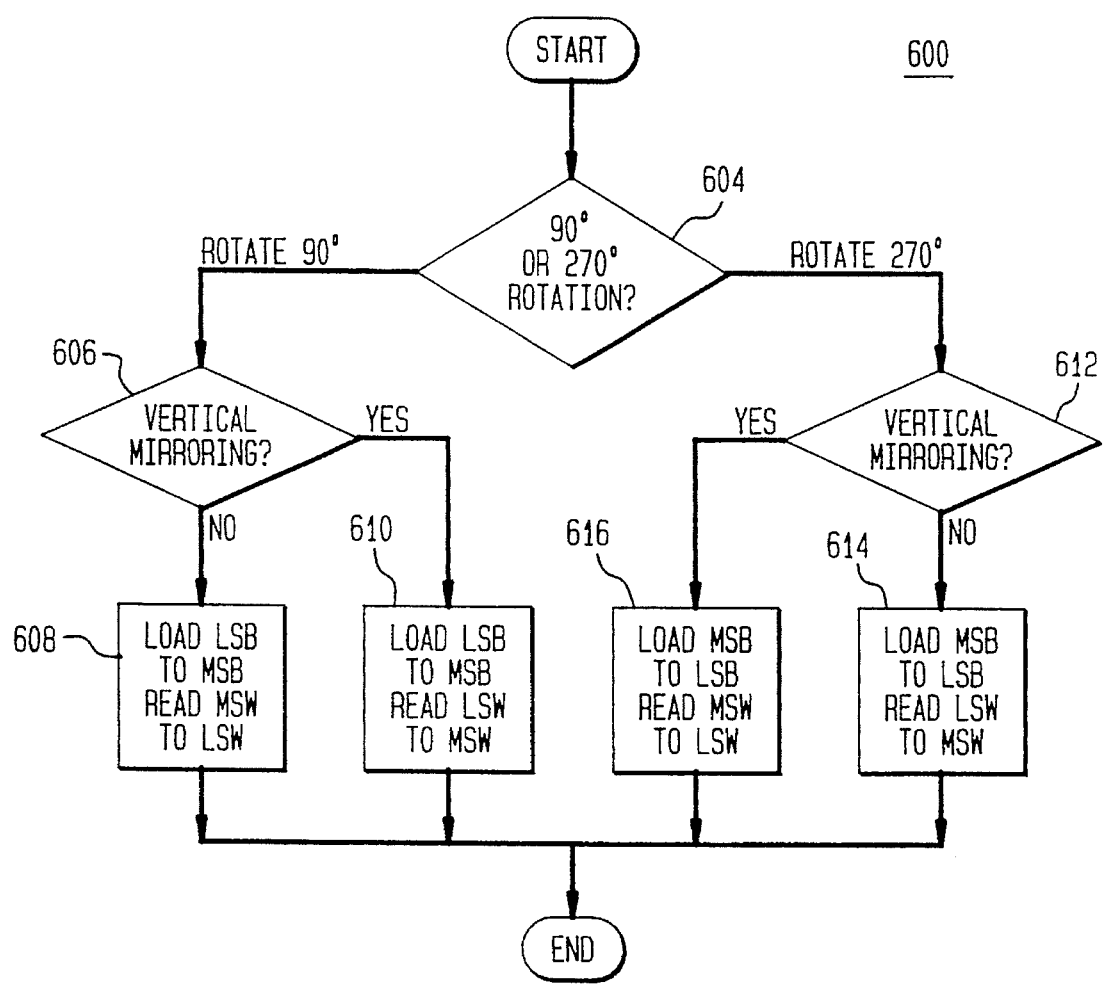
FIG. 6 illustrates a high level flow chart of the methodology of the present invention.

FIG. 6 illustrates the methodology of the present invention to be implemented in the architecture shown in FIG. 3. As indicated in FIG. 6, orthogonal rotation and vertical mirroring is essentially accomplished by the order in which source data bytes are loaded from the source bit map 302 into the register array 306 and by the order in which data words are read from the register array 306 into the destination bit map 322.

Specifically, to accomplish a 90° rotation without vertical mirroring, as shown in FIG. 4(a), the control logic 304 loads each data byte 324–330 from the source bit map 302 into the columns of the register array 306 by beginning with the column (LSB column) having the LSB position of each register row 308–314 and ending with the column (MSB column) having the MSB position of each register row 308–314. Furthermore, data words (1 word=4 bytes) are then read from the register array 306 beginning with the MSW in the bottom register 314 and ending with the LSW in the top register 308. The foregoing methodology is indicated in flow chart blocks 604, 606, and 608 of FIG. 6.

It should be noted that the 90° rotation without vertical mirroring could have been performed by first multiplexing the source data bits in the reverse order than what is shown in FIG. 3, by then loading the bytes into the columns of the register array 306 by beginning with the LSB column and ending with the MSB column, and by finally reading the data words from the top register 308 to the bottom register 314. In essence, reversing the order of the source bits takes care of having to read the data words from the bottom register 314 to the top register 308. The preceding methodology is also equally applicable to the discussion which follows further below in regard to a 270° rotation with vertical mirroring.

In order to achieve a 90° rotation with vertical mirroring, as shown in FIG. 4(c), data bytes are loaded into the register array 306 beginning with the LSB column and ending with the MSB column. Further, data words are then read from the register array 306 beginning with the LSW in the top register 308 and ending with the MSW in the bottom register 314. The foregoing methodology is indicated in blocks 604, 606, and 610 of FIG. 6.

To accomplish a 270° rotation without vertical mirroring, as shown in FIG. 4(b), data bytes are loaded into the register array 306 by beginning with the MSB column and ending with the LSB column. Then, data words are read from the register array 306 beginning with the LSW in the top register 308 and ending with the MSW in the bottom register 314. The foregoing methodology is indicated in blocks 604, 612, and 614 of FIG. 6.

In order to effectuate a 270° rotation with vertical mirroring, as shown in FIG. 4(d), data bytes are loaded into the register array 306 by beginning with the MSB column and ending with the LSB column. Then, data words are read from the register array 306 beginning with the MSW in the bottom register 314 and ending with the LSW in the top register 308. The foregoing methodology is indicated in blocks 604, 612, and 616 of FIG. 6.

Another advantage of the present invention is that the orthogonal rotator 300 may be used in combination with a simple horizontal mirroring system which can effectively rotate a bit map region by an angle of 180°, to thereby provide for all rotations in increments of 90°.

III. Environment of Present Invention

A feature of the invention is the provision of special function circuits within a RISC microprocessor which are used by special graphics functions and integrated into the processor in the same way as other function units.

Figure 7:
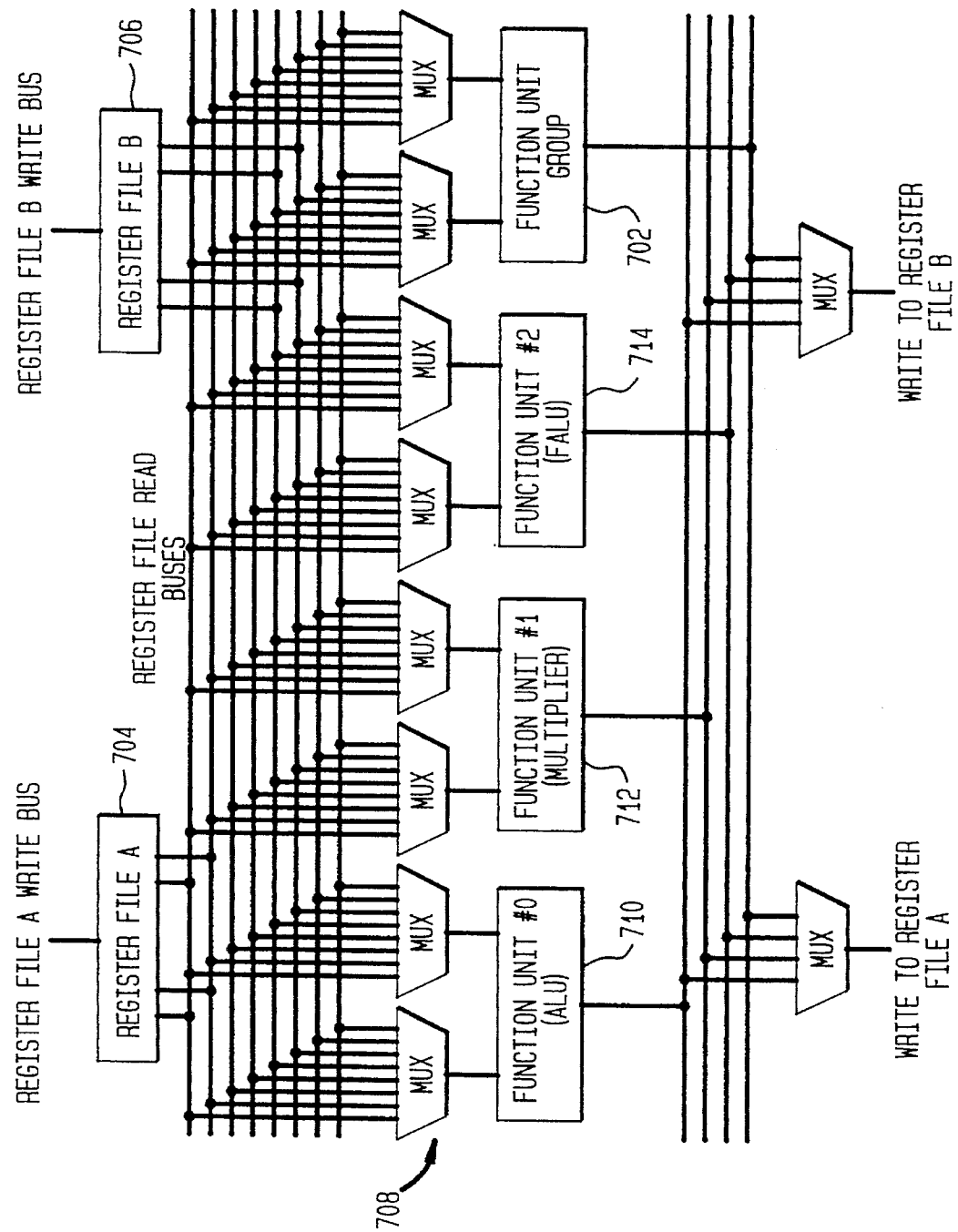
FIG. 7 illustrates the integration of the special function circuitry of FIGS. 1–3 into an Instruction Processing Unit of a RISC Processor.

FIGS. 7 illustrates the integration of the special function circuitry of FIGS. 1–3 into an Instruction Processing Unit (IPU). The special function circuits of FIGS. 1–3 can be integrated as function units or within function unit groups. For example, FIG. 7 shows circuitry 702 identified as a Function Unit Group and is interconnected with register filed A and B (704 and 706) through MUXes (708) just as the other Function Units (e.g. ALU 710, Multiplier 712, FALU 714) are interconnected.

The graphics function units are completely integrated into the RISC IPU. The function units are used by special graphics instructions, which are executed in exactly the same way as other RISC instructions. The RISC core is capable of "super scaler" operation, where more than one instruction may be executed and/or completed per cycle. The graphics function units are scheduled by the scheduler in the same way as the other, more standard, function units, such as the ALU's or multipliers. The orthogonal rotator and pixel modification units contain internal "state" information, which must be maintained during IPU context switches. These state registers are handled in the same way as other processor state information (e.g. divider quotient and remainder registers) through special register move instructions between the register files and the function units. The function units are available to the A and B IPU register files symmetrically through the same set of buses as the shifter function unit.

Although the preferred embodiment of the present invention has been described in detail above, those skilled in the art will readily appreciate the many additional modifications and applications that are possible without materially departing from the novel teachings of the present invention. For example, in the preferred embodiment, only one bit in the bit map 101 corresponds to a pixel, because the pixel modification unit 100 is envisioned for a black/white printer. However, the principles described are equally applicable to grey scale or color printer systems as well as video screen systems. Accordingly, all such modifications and applications are intended to be included within the scope of the present invention as defined within the subjoined claims.

The following is claimed:

1. A system for bitwise manipulation of raster graphics data as a functional unit that executes instructions within a superscalar microprocessor and shares a memory interface with other of a plurality of functional units, comprising:

bus means within the superscalar microprocessor, coupled to a logic function means, for receiving a source operand and a destination operand, said source and destination operands each comprising a plurality of bits;

logic function means within the superscalar microprocessor for performing a bitwise logic operation between said source operand and said destination operand to generate a modified destination operand, said source operand being selected from the group comprising fixed data and a secondary bit map, said destination operand being a primary bit map corresponding to an image to be manipulated;

a masking means within the superscalar microprocessor for generating multiplexer control signals; and a multiplexer within the superscalar microprocessor that performs, in response to said multiplexer control signals, bit-wise selection between said bits of said modified destination operand and said destination operand to provide an output, said multiplexer coupled to at least said logic function means so as to receive said modified destination operand, to said masking means to receive said set of multiplexer control signals, and to said destination operand.

2. The system of claim 1, wherein said masking means comprises a right mask generator, a left mask generator, and a combiner, said right and left mask generators for providing a respective right and left mask output for defining a respective right and left mask, said combiner for logically combining said right and left mask outputs with a mask operand to produce said multiplexer control signals.

3. The system of claim 1, further comprising a byte mirror means for moving bit map data forming a figure in said image, said bit map data organized as bytes and said bytes having a predetermined bit order, so that said figure is horizontally reflected in said image.

4. The system of claim 2, wherein said combiner performs a logic OR function.

5. The system of claim 3, further comprising a means for reversing said order of bits within each byte of an inputted mirror operand so as to effectuate said reflection.

* * * * *